INVENTOR.
Hans Fischer

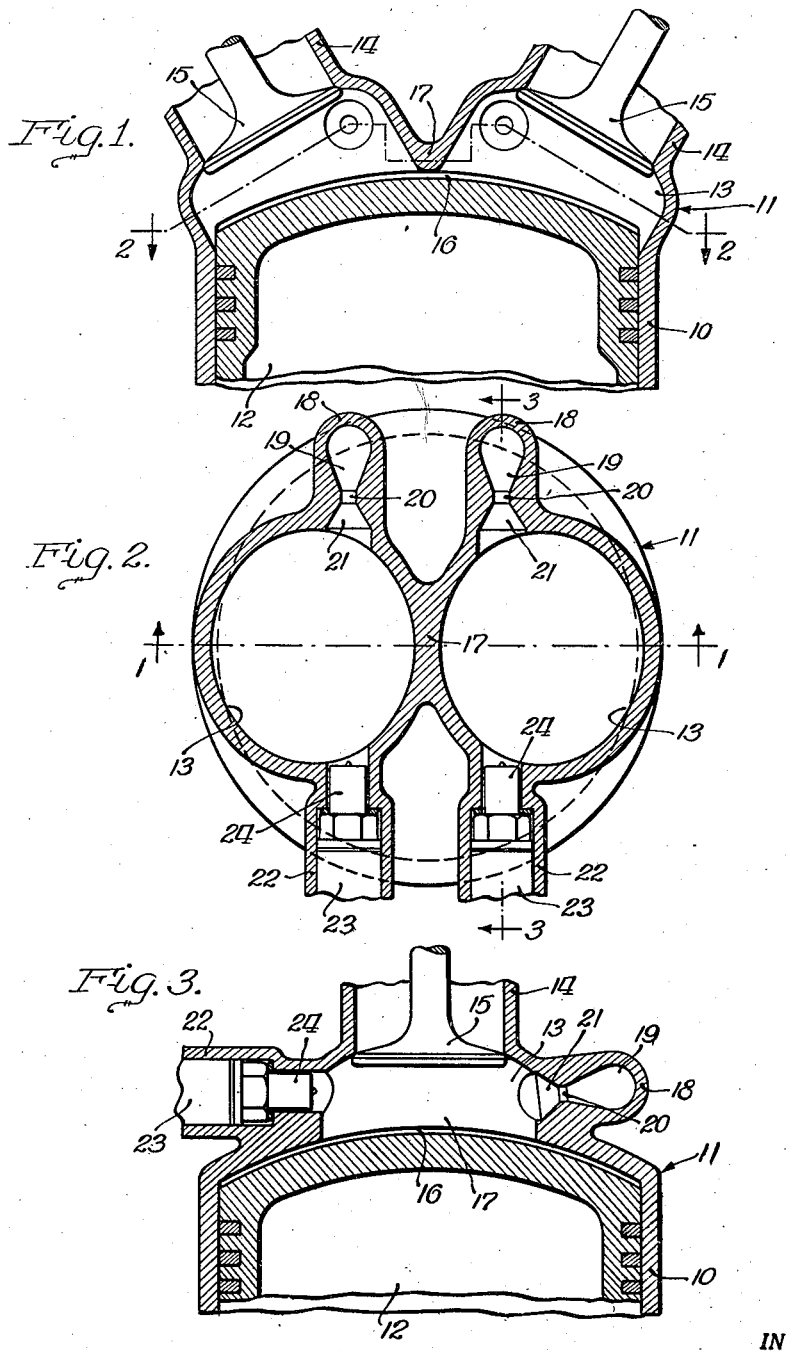

Patented Oct. 24, 1944

2,360,943

UNITED STATES PATENT OFFICE 2,360,943

INJECTION ENGINE

Hans Fischer, Yonkers, N. Y., assignor to Lanova Corporation, Long Island City, N. Y., a corporation of Delaware Application May 13, 1943, Serial No. 486,841

1 Claim. (Cl. 123—32)

This invention relates to injection engines, and has to do with engines of the supplementary chamber solid injection type, in which the fuel is injected mechanically and without the aid of an air blast.

In engines of the character referred to, high pressure is created in the supplementary chamber or cell, as it frequently is termed, by rapid combustion therein, with resulting ejection of a high pressure, high velocity blast therefrom into the combustion chamber to assist there in dispersion and combustion of the injected fuel, such engines being commonly designated energy cell engines.

The present practice in engines of this type is to inject the fuel into a single combustion space overlying or opening into the cylinder bore, through a single nozzle and generally toward and into a supplementary chamber or energy cell, or through a plurality of nozzles toward and into a plurality of more or less opposed energy cells. These engines have proved to be highly efficient in the smaller sizes having a cylinder displacement volume of 86 cubic inches or less, but are not so highly efficient in the larger sizes.

In order that an injection engine may be efficient in operation, combustion should be completed during travel of the piston from its inner dead center position outward through a distance corresponding to turning of the crank shaft through an angle of twenty degrees, that is, within twenty crank degrees from inner dead center position of the piston. That is equally true for engines having cylinders of small diameter and for engines having cylinders of large diameter. In an engine having a cylinder displacement volume of 86 cubic inches, a piston stroke of 5½ inches, and a piston speed of 2000 feet per minute, the time available for completion of combustion, if efficient operation is to be had, is .00153 second. It is possible in such an engine to have complete combustion within that short period of time, due to the fact that the volume of the compression space is sufficiently small to assure that the high turbulence created by the blast from the energy cell will cause thorough mixing with the injected fuel of all of the available combustion supporting air, with resulting rapid combustion and completion thereof, within the time stated. There are a number of factors which contribute to that result. The capacity of the energy cell and the distance between the passage leading thereto and the orifice of the injection nozzle, are so related that the proper amount of the injected fuel enters the cell to form with the air therein a fuel-air mixture which will burn extremely rapidly. That assures ejection of a high pressure, high velocity blast from the cell into the compression space, assuring completion of combustion within the time available. This blast is a result of the pressure differential in the cell and in the combustion space or chamber, regardless of the cylinder size, and the capacity of the cell should be only that required to assure the desired results, since if it were greater than required an unnecessary amount of fuel would be burned in the cell, reducing the efficiency of the engine, and the blast from the cell would not occur quickly enough, or at sufficiently high velocity, to assure completion of combustion within the limited time available, further reducing efficiency. There is thus a more or less fixed relation between the volume of the combustion chamber, the volume or capacity of the energy cell space, and the distance between the port of the injection nozzle and the passage leading to the energy cell, which must be maintained in order to assure completion of combustion within 20 degrees crank angle and resulting maximum efficiency of the engine. That relation can be maintained in engines having a cylinder displacement volume of 86 cubic inches or less, but it cannot be maintained in engines having a cylinder displacement volume materially greater than 86 cubic inches, for reasons which will be explained.

For purposes of comparison, we will consider an engine having a cylinder displacement volume of 86 cubic inches, a 5½ inch stroke, a piston speed of 2000 feet per minute, and an output based on a mean indicated pressure of 170 pounds per square inch; and an engine having a cylinder displacement volume of 131 cubic inches, a 5½ inch piston stroke, a piston speed of 2000 feet per minute, and an output based on a mean indicated pressure of 170 pounds per square inch. The amount of fuel injected into the smaller engine per combustion stroke is 105 cu. mm. and the amount of fuel injected into the larger engine per combustion stroke is 161 cu. mm. The amount of fuel to be burned in the larger engine is approximately 50% greater than that to be burned in the smaller engine, but in both engines the fuel has to be injected and combustion completed within the same limited time, i. e., .00153 second. Also, in the larger engine the necessary amount of combustion supporting air is correspondingly greater than in the smaller engine, and the combustion chamber is of greater volume. In order to mix the larger volume of air and the greater amount of fuel and obtain complete combustion within the limited time available, in the larger combustion chamber of the larger engine of this type having a single combustion chamber opening into the cylinder bore, it would be necessary to have a blast from the engine cell of much higher velocity than the blast ejected from the energy cell of the smaller engine. But that is not possible, since the velocity of the blast from the cell is a function of the pressure differential between the cell and the combustion chamber, which is substantially the same regardless of cylinder size, and cannot be increased by increasing the capacity of the cell, nor can the duration of the blast from the cell be increased by increasing its capacity, since a larger cell requires a larger opening for charging it with fuel. Briefly, the capacity of the cell is substantially fixed relative to the volume of the combustion chamber, as previously stated.

My invention is directed to an energy cell engine of the character stated which will avoid the difficulties above referred to with respect to engines having a cylinder displacement volume greater than 86 cubic inches and which will operate at the same high efficiency as the smaller engines. I have found that it is possible to attain that result by dividing the injected fuel and the combustion supporting air into two or more portions and mixing and burning each portion separately, but causing ignition and burning of the separate portions to occur simultaneously. More specifically, I provide a combustion space divided into a plurality of combustion chambers which remain separated from each other, so far as combustion is concerned, during the combustion period of 20 crank degrees, each combustion chamber having an energy cell, and inject a portion of the required total amount of fuel into each of the separate combustion chambers, the volume of each combustion chamber and related factors being so chosen as to assure completion of combustion within each chamber during the available combustion period stated. Further objects and advantages of my invention will appear from the detail description.

In the drawings:

Figure 1 is an axial sectional view of the upper end portion of a cylinder and cylinder head of an engine embodying my invention, with the inlet and exhaust valves shown in elevation, taken substantially on line 1—1 of Figure 2;

Figure 2 is a sectional view taken substantially on line 2—2 of Figure 1;

Figure 3 is a sectional view taken substantially on line 3—3 of Figure 2;

Figure 5:
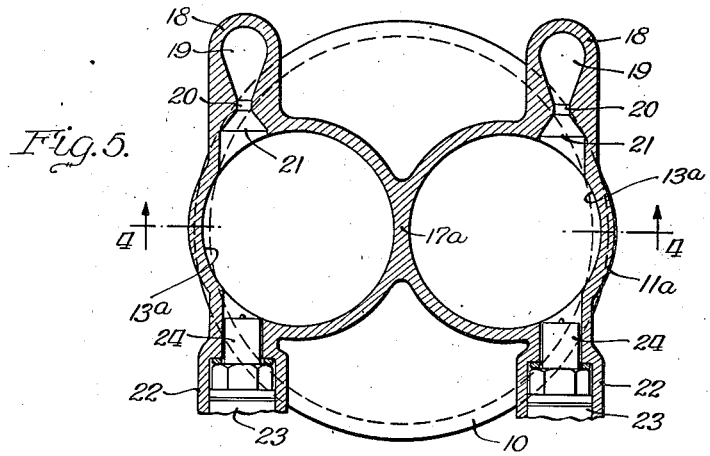
Figure 5 is a sectional view taken substantially on line 5—5 of Figure 4.

The drawings are semi-diagrammatic in character and show only those parts of the engine with which my invention is directly concerned, it being understood that the complete engine includes a fuel pump, injection timing means, valve operating mechanism and many other parts well known in the art, including suitable means for cooling the engine cylinders by means of either a liquid coolant or a gaseous coolant such as air.

Referring to Figures 1 to 3, inclusive, the engine comprises a cylinder 10 having a head 11, which may be formed integrally with the cylinder, as shown, or separately from and bolted to the cylinder, as is well known, and a piston 12 operating in the cylinder. The head 11 comprises two combustion chambers 13 of elliptical shape in transverse section, as shown in Figure 2, each having a conduit 14 opening into its top and controlled by an inwardly opening and outwardly closing valve 15 seating in the inner end of the conduit. The conduits 14 define passages, one of which may be an inlet passage for air, the corresponding valve 14 being the inlet valve, and the other of which may be an exhaust passage for the burned gases, the corresponding valve being the exhaust valve. When the piston 12 is in its inner dead center position, shown in Figure 1, which is its position of maximum compression, there is but slight clearance 16 between the upper face of the piston and the overlying under face of the head 11, only that required for mechanical reasons.

The combustion chambers 13 are oppositely inclined to the cylinder axis, downwardly and inwardly of the cylinder, as are the valves 15, and have their inner side walls connected at their inner or lower ends by a V-shaped bridge element 17. Each of the combustion chambers 13 is provided, at the side thereof adjacent bridge element 17, with a boss 18 defining an interior supplementary chamber or cell 19 of ovoidal shape, tapering inward. Cell 19 opens at its inner end, through a restricted orifice 20, into a funnel-shaped passage 21 which opens at its inner end into combustion chamber 13. Each of the combustion chambers 13 is also provided, at the side thereof opposite to boss 18, with a boss 22 in which is mounted, in a suitable known manner, a fuel injection nozzle 23 of suitable known type, having a tip 24 provided with a port disposed to inject a spray of fuel into chamber 23 and across the latter into passage 21 and thence into cell 19.

The top surface of the piston 12 is in the form of a segment of a sphere and the overlying under surface of the head 11 is correspondingly formed, to assure minimum clearance therebetween at 16, as above noted. The capacity of the cell 19 is approximately ten per cent of the total volume of that cell and the corresponding combustion chamber 13, and the distance between passage 21 and the tip 24 of injection nozzle 23 is such as assure entry of the injected fuel into cell 19 in proper amount to form with the air therein a quick burning fuel-air mixture.

During the compression stroke of the piston 12, the displaced air is forced into the combustion chambers 13 and through passages 21 and orifices 20 into the cells 19. The pressure in each of the combustion chambers 13 increases as the compression stroke of the piston proceeds, but remains higher in each chamber 13 than in its associated cell 19, due to the throttling effect of orifice 20, which is properly proportioned to that end. As the piston 12 approaches top dead center position, injection of fuel by both injection nozzles 23 begins, the two being appropriately connected to the same injection pump, or to properly timed individual pumps, for that purpose. At about from 4° to 6° before top dead center position of the piston 12, the fuel in each of the combustion chambers 13 is ignited by the heat of compression but burns therein relatively slowly, because the injected fuel has not yet been dispersed and thoroughly mixed with the air in chambers 13, being mixed only with a portion of that air and forming therewith a rich slow burning mixture. Accordingly this preliminary burning of a portion of the injected fuel in the chambers 13 does not cause a material rise in pressure therein. The injection of fuel continues until about top dead center position of the piston, at which time fuel injection is terminated. It will be understood, of course, that the injection of fuel may be varied somewhat, depending upon operating conditions, as is known.

At about top dead center position of piston 12, the quick burning fuel-air mixture in each of the supplementary chambers or cells 19 is ignited, by flame propagation from chamber 13 or by increase of pressure in cell 19 incident to pressure increase in chamber 13, or by both. The combustion in each cell 19 is extremely rapid and causes an abrupt rise of pressure therein to a relatively high value, which may be twice the pressure then obtaining in each combustion chamber 13. The relatively high pressure in each cell 19 causes the ejection therefrom, at about from 4° to 6° after top dead center position of piston 12, of a high pressure high velocity stream of incandescent gases, in the nature of a blast, through orifice 20 and passage 21 of each of the cells 19 into its associated combustion chamber 13. That occurs while the piston 12 is substantially on the dwell of its compression stroke, ready to start down on its working stroke, and the body of air for supporting combustion of the fuel is confined within the combustion chambers 13. The blast from each of the cells 19 causes instantaneous and thorough mixing of the unburned air and fuel in each of the combustion chambers 13, resulting in greatly accelerating the rate of combustion therein, such that the combustion of the fuel is completed before appreciable movement of the piston 12 on its working stroke has occurred. In that connection, the extent of movement of the piston from its top dead center position during movement of the engine crank shaft through an angle of 20 degrees is negligible, and for all practical purposes the piston then occupies its position shown in Figure 1. In that position of piston 12, the space between the upper face thereof and the under face of the areas of head 11 surrounding the combustion chambers 13 is slight, such that the cooling effect of the opposed metal walls will quench any flames tending to pass from one combustion chamber 13 to the other. Consequently, mixing together of the fuel and the air in each combustion chamber, and combustion of the resultant mixture, occurs and proceeds to completion independently of the mixing and combustion occurring in the other chamber, though both proceed simultaneously since the fuel in each is ignited by the compression of the charge by the piston. After completion of combustion, the piston is driven outward in its working stroke by expansion of the hot products of combustion, as is known.

By separating the total amount of fuel injected per combustion stroke into a plurality of portions, and mixing each portion of the fuel with its proportionate amount of combustion supporting air, and then burning each portion of the fuel-air mixture separately until combustion thereof has been completed, I provide a novel method of operation which renders possible efficient and high speed operation of solid injection energy cell engines of much larger sizes than can be operated at high efficiency when a single combustion chamber is used. While my invention is particularly suited to larger engines of the character referred to, having a cylinder displacement volume in excess of 86 cubic inches, it is not limited to such larger engines since, in certain cases, it may be used to advantage in smaller engines. The energy cell 19 of each of the combustion chambers 13, together with its orifice 20 and passage 21, preferably is inclined downward and inward of the cylinder, as shown in Figure 3. That avoids direct impingement of the blast from cell 19 on the tip 24 of nozzle 23 and objectionable heating thereof, and is desirable in certain cases. While I usually prefer to arrange the energy cell 19 as stated, that is not essential to my invention, and it may be otherwise suitably disposed. It will also be understood that the injection nozzles 23 may be separate structures, or may be parts of the same nozzle structure providing for separate injection into each of the combustion chambers 13 of the proper proportionate part of the total amount of fuel injected per combustion stroke of the piston. Also, under certain conditions, as when operating under light load or idling, one or more of the injection nozzles, if more than two combustion chambers be provided, may be disabled in any suitable known manner. In that connection, it is to be understood that I contemplate providing any suitable number of combustion chambers, each with its associated injection nozzle and energy cell, as conditions may require, and have shown but two combustion chambers by way of example and to explain the principle of my invention. Also, my invention comprehends two cycle engines as well as four cycle engines.

Figure 4:
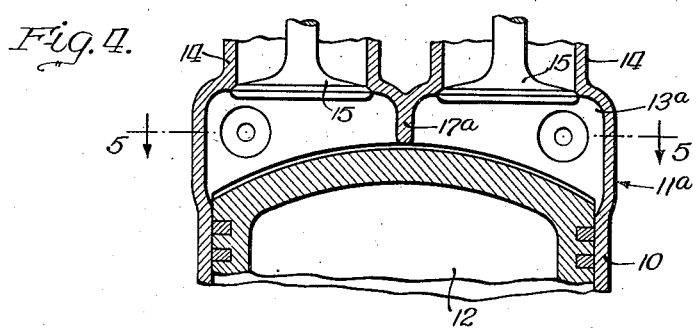
Figure 4 is a view similar to Figure 1, taken substantially on line 4—4 of Figure 5, showing a modified form of engine embodying my invention.

In the modified form of engine shown in Figures 4 and 5, combustion chambers 13a are of circular cross-section and the axes thereof are parallel with the cylinder axis, as are the axes of the valves 15, the inner side walls of combustion chambers 13a are joined by a bridge element 17a of substantially uniform cross-section, and the energy cells 19 and the injection nozzles 23 are disposed at the outer sides of the combustion chambers 13a. Otherwise, the engine of Figures 4 and 5 is similar to that of Figures 1 to 3, inclusive, and further description thereof here is not necessary.

Figures 6, 7:
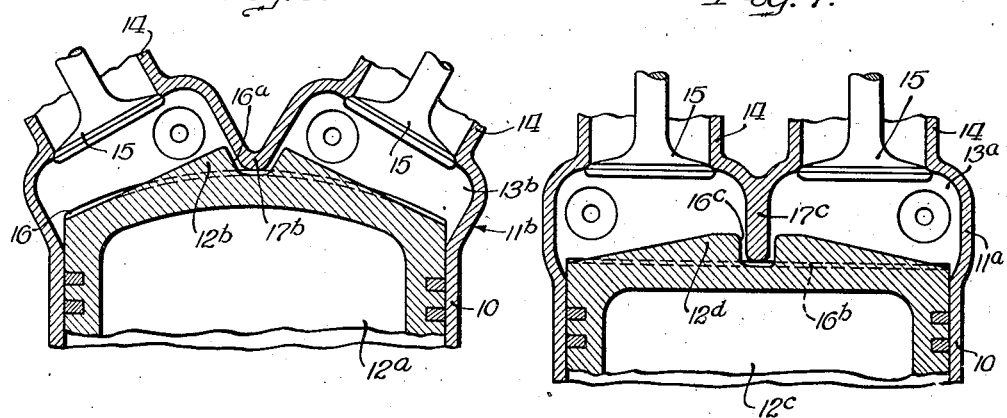
Figure 6 is a view similar to Figure 1 of a second modified form of engine embodying my invention.
Figure 7 is a view similar to Figure 6 of a third modified form of engine embodying my invention.

The modified form of engine shown in Figure 6 has a piston 12a provided on its upper or inner end with two projections 12b disposed to extend into the inner portions of combustion chambers 13b, when piston 12a is in its top dead center position shown. In that position of piston 12a, the inner side portions of projections 12b are spaced from the lateral surfaces of the inner side walls of combustion chambers 12a and bridge element 17b, connecting the inner ends of those walls, the minimum distance required for mechanical reasons, providing restricted clearance 16a between such surfaces. The engine of Figure 6 is otherwise similar to that of Figures 1 to 3, inclusive, and need not be described in greater detail here.

In the modified engine shown in Figure 7, the piston 12c is flat at its upper end except for the provision of two projections 12d disposed to enter the lower or inner portions of combustion chambers 13a, when the piston is in its top dead center position shown. In that position of piston 12c the inner sides of projections 12d are spaced from the lateral surfaces of a bridge element 17c, constituting the major portion of the inner side walls of combustion chambers 13a, the minimum distance required for mechanical reasons, providing but slight clearance 16c. Also, the distance between the top of the piston 12c and the overlying areas of the head 11a surrounding the combustion chambers, is the minimum required for mechanical reasons, providing but slight clearance 16b. The engine of Figure 7 is otherwise similar to that of Figure 4 and requires no further detailed description here.

It will be understood, as above indicated, that changes in construction and arrangement of parts of the engine may be resorted to without departing from the field and scope of my invention, and I intend to include all such variations, as fall within the scope of the appended claim, in this application in which the preferred forms only of my invention have been disclosed.

I claim:

In an injection engine of the compression ignition type, a cylinder and a piston operating therein, a head overlying said cylinder, an imperforate wall element projecting inwardly from said head and defining with the peripheral wall of the head a plurality of separate combustion chambers, supplementary chambers respectively opening into said combustion chambers through a restricted orifice and a funnel like passage flaring from said orifice toward the associated combustion chamber, and injection means for said combustion chambers having a port opening into each thereof disposed to inject fuel thereacross into the passage of the associated supplementary chamber, the distance between the respective ports and passages being such as to assure entry of the injected fuel into each supplementary chamber in proper amount to form with the air therein a quick burning fuel-air mixture effective for producing within said supplementary chamber incident to combustion therein relative high pressure effective for ejecting therefrom a high-pressure, high-velocity blast of gases through said orifice and passage, the volume of each combustion chamber being such that the blast ejected thereinto from its associated supplementary chamber effects substantially instantaneous and thorough mixing together of substantially all of the unburned fuel and unconsumed air therein with resultant completion of combustion while the piston remains substantially on the dwell of its working stroke, said imperforate wall element of the head extending inwardly to cooperate with the piston head whereby at the inner dead center position of the piston there is substantially no clearance between the piston head and said imperforate wall element thereby preventing combustion passing from one chamber to another thereof so that combustion in each of said chambers is substantially completed independently of combustion in the remainder thereof while the piston is on the dwell of its working stroke.

HANS FISCHER.